US012679068B2

(12) United States Patent   Boucké

(10) Patent No.: US 12,679,068 B2
(45) Date of Patent: Jul. 14, 2026

(54) DECORATIVE PANEL AND METHOD FOR MANUFACTURING OF SUCH A DECORATIVE PANEL

(71) Applicant: I4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 279 days.

(21) Appl. No.: 18/563,328

(22) PCT Filed: May 27, 2022

(86) PCT No.: PCT/EP2022/064454
§ 371 (c)(1),
(2) Date: Nov. 21, 2023

(87) PCT Pub. No.: WO2022/248690
PCT Pub. Date: Dec. 1, 2022

(65) Prior Publication Data
US 2024/0246316 A1     Jul. 25, 2024

(30) Foreign Application Priority Data

May 28, 2021   (NL) ...................................... 2028334
Nov. 16, 2021   (NL) ...................................... 2029777
Nov. 19, 2021   (NL) ...................................... 2029824

(51) Int. Cl.
*B32B 9/00*          (2006.01)
*B32B 3/06*          (2006.01)
(Continued)

(52) U.S. Cl.
CPC ................ *B32B 9/007* (2013.01); *B32B 3/06* (2013.01); *B32B 5/18* (2013.01); *B32B 9/046* (2013.01); *B32B 37/24* (2013.01); *E04F 13/0866* (2013.01); *E04F 13/0894* (2013.01); *E04F 15/02038* (2013.01); *E04F 15/107* (2013.01); *B32B 2037/243* (2013.01);
(Continued)

(58) Field of Classification Search
USPC .......................................................... 977/734
See application file for complete search history.

(56) References Cited

U.S. PATENT DOCUMENTS

2009/0145066 A1*   6/2009   Pervan .................. B44C 5/0469
                                                         209/11
2011/0135884 A1*   6/2011   Lettow ................... H05K 1/095
                                                         977/734
(Continued)

FOREIGN PATENT DOCUMENTS

CN          106088502 A   * 11/2016   .......... E04F 13/0891
CN          108045040 A      5/2018
(Continued)

*Primary Examiner* — Brent W Herring
(74) *Attorney, Agent, or Firm* — The Webb Law Firm

(57) ABSTRACT

A decorative panel, in particular a floor panel, ceiling panel or wall panel, including a core provided with an upper side and a lower side, a decorative top structure affixed, either directly or indirectly, on said upper side of the core, a first panel edge including a first coupling profile, and a second panel edge including a second coupling profile being
(Continued)

Figure 1:
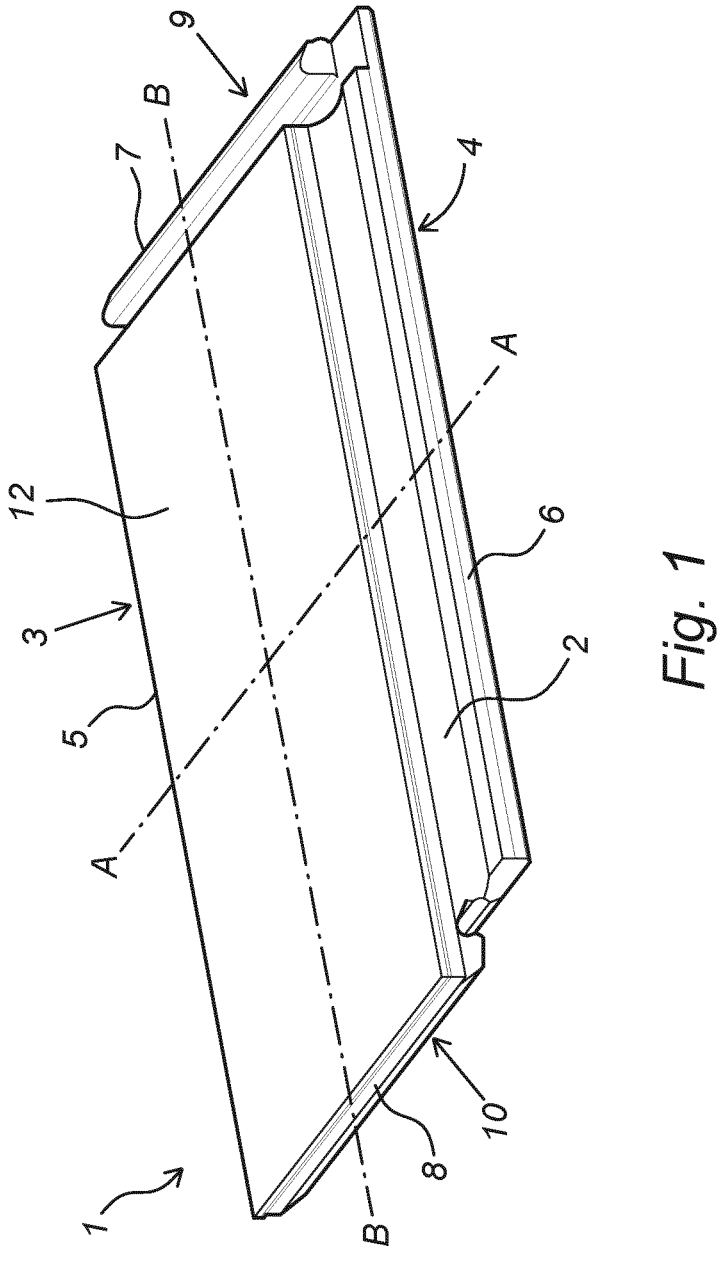

designed to engage interlockingly with said first coupling profile of an adjacent panel, both in horizontal and in vertical direction.

19 Claims, 3 Drawing Sheets

(51) Int. Cl.

| | |
|---|---|
| *B32B 5/18* | (2006.01) |
| *B32B 9/04* | (2006.01) |
| *B32B 37/24* | (2006.01) |
| *E04F 13/08* | (2006.01) |
| *E04F 15/02* | (2006.01) |
| *E04F 15/10* | (2006.01) |

(52) U.S. Cl.
CPC ... *B32B 2255/20* (2013.01); *B32B 2266/0278* (2013.01); *B32B 2266/06* (2013.01); *B32B 2305/022* (2013.01); *B32B 2307/202* (2013.01); *B32B 2307/206* (2013.01); *B32B 2307/554* (2013.01); *B32B 2313/04* (2013.01); *B32B 2375/00* (2013.01); *B32B 2451/00* (2013.01); *B32B 2607/00* (2013.01); *E04F 2201/0138* (2013.01); *E04F 2201/0153* (2013.01); *E04F 2201/023* (2013.01); *E04F 2201/042* (2013.01); *E04F 2201/043* (2013.01)

(56) References Cited

U.S. PATENT DOCUMENTS

| | | | | |
|---|---|---|---|---|
| 2014/0014030 A1* | 1/2014 | Tour | ...................... | B82Y 40/00 |
| | | | | 117/97 |
| 2017/0037640 A1* | 2/2017 | Boucké | ................ | E04F 15/107 |
| 2017/0217389 A1* | 8/2017 | Macaraeg | ................ | B32B 7/12 |
| 2020/0011542 A1* | 1/2020 | Ching | ................... | H05B 3/145 |
| 2020/0316919 A1* | 10/2020 | Gier | ....................... | B32B 21/06 |

FOREIGN PATENT DOCUMENTS

| | | | | | | |
|---|---|---|---|---|---|---|
| CN | 108454209 A | * | 8/2018 | .............. | B32B 3/30 |
| CN | 108777888 A | * | 11/2018 | .............. | H05B 3/22 |
| CN | 110424675 A | * | 11/2019 | ........... | E04F 15/024 |
| CN | 111119428 A | | 5/2020 | | |
| CN | 111393867 A | * | 7/2020 | ........... | B32B 21/02 |
| CN | 112343293 A | * | 2/2021 | ........... | E04F 15/024 |
| GB | 2559473 A | | 8/2018 | | |
| JP | H9209475 A | | 8/1997 | | |
| JP | H9317052 A | | 12/1997 | | |
| KR | 20130000786 A | * | 1/2013 | .............. | H01B 1/04 |
| KR | 101631567 B1 | * | 6/2016 | ........... | C09J 175/04 |
| KR | 101788542 B1 | | 10/2017 | | |
| WO | WO-2014038600 A1 | * | 3/2014 | .............. | B32B 7/05 |
| WO | WO-2022112417 A1 | * | 6/2022 | ........... | E04B 9/0435 |

* cited by examiner

DECORATIVE PANEL AND METHOD FOR MANUFACTURING OF SUCH A DECORATIVE PANEL

CROSS-REFERENCE TO RELATED APPLICATIONS

This application is the United States national phase of International Application No. PCT/EP2022/064454 filed May 27, 2022, and claims priority to The Netherlands Patent Application No. 2028334 filed May 28, 2021, U.S. Pat. No. 2,029,777 filed Nov. 16, 2021, U.S. Pat. No. 2,029,824 filed Nov. 19, 2021, the disclosures of which are hereby incorporated by reference in their entireties.

BACKGROUND OF THE INVENTION

Field of the Invention

The invention relates to a decorative panel, in particular a floor panel, ceiling panel or wall panel, comprising: a core provided with an upper side and a lower side, a decorative top structure affixed, either directly or indirectly, on said upper side of the core, a first panel edge comprising a first coupling profile, and a second panel edge comprising a second coupling profile being designed to engage interlockingly with said first coupling profile of an adjacent panel, preferably both in horizontal and in vertical direction.

Description of Related Art

In the field of decorative floor coverings, decorative panels are known having a MDF (Medium Density Board) or HDF (High Density Board) based core layer on top of which a decorative substrate is attached to provide the panels a desired appearance. A major disadvantage of these known panels is the hygroscopic nature of the core layer, which affects the lifetime and durability of such panels. For this reason, the traditional MDF/HDF based panels are more and more replaced by polyvinyl chloride (PVC) based panels, also provided with a decorative substrate on top. These PVC based panels have the advantage over of being relatively waterproof compared to MDF/HDF based panels. The PVC based panels are typically enriched with chalk (calcium carbonate), acting as inert filler, wherein the applied amount of chalk has been increased in the course of time, in particular to reduce the cost price of the panels. These panels are also referred to as stone-plastic composite (SPC) panels. Typically, these panels comprise a decorative layer covered by a wear layer to protect said decorative layer and to lengthen the useful life of the floor panel as such.

Such wear layers are often composed of transparent polyvinylchloride (PVC) or transparent polyurethane (PU). A top coating may be applied on top of said wear layer to improve the scratch resistance of the floor panel. Although the above decorative floor coverings have advantages, a remaining drawback of various floor panels is that the floor panels are not configured to withstand high local pressures exerted onto the floor panel during normal use, e.g. walking across said floor panels with high-heel shoes, which easily leads to dents (indentations), holes, or other kind of damages. This inferior indentation and impact resistance may be caused by a relatively thin and/or soft wear layer and/or core layer, which is unable to resist heavy objects or impacts, and which may easily lead to (micro-)damages, and/or plastic deformation (permanent deformation).

SUMMARY OF THE INVENTION

It a first object of the present invention to provide a decorative panel suitable with an improved impact resistance.

It a second object of the present invention to provide a laminated decorative panel comprising an improved decorative top structure with an improved impact resistance.

It a third object of the present invention to provide a laminated decorative panel comprising an improved, polymer based, decorative top structure with an improved impact resistance.

It a fourth object of the present invention to provide a laminated decorative panel comprising improved antimicrobial properties.

It a fifth object of the present invention to provide a laminated decorative panel comprising improved antimicrobial properties.

At least one of these objects is met by the provision of a decorative panel according to the preamble, wherein the decorative top structure comprises graphene and/or at least one derivative of graphene. It has been found that by incorporating graphene and/or at least one derivate of graphene in the decorative top structure, the hardness, and hence the indentation and impact resistance of the top structure, and hence of the decorative panel as such, can be increased significantly.

Graphene is a single two dimensional layer (2D layer) of carbon atoms, arranged in the form of a honeycomb lattice. This thin, one atom thick lattice is relatively strong, flexible, light-weight, and easy to process, which makes this material very suitable to be incorporated in a decorative panel according to the invention to improve its impact resistance. Moreover, graphene also exhibits excellent heat and electricity conducting properties, which beneficial properties may also be used to further improve the decorative panel according to the invention, as will be elucidated below in more detail. Moreover, graphene and/or (monolayer) derivatives of graphene display excellent anti-oxidant and scratch-resistant properties. Furthermore, it was found that the graphene and/or derivatives of graphene exhibit(s) excellent antimicrobial properties, which fulfils the need to improve existing panels which still have the known benefits while reducing the risk of bacteria growth on and/or in between said panels, in order to expand the applicability of the panels. Consisting of a single 2D layer of carbon atoms, graphene and derivatives thereof (e.g. graphene oxide) are light, strong, flexible and transparent with high conductivity for electricity and heat. This also makes graphene distinctive over e.g. graphite having a different molecular structure (based upon a 3D crystalline structure of carbon atoms) and different properties. In addition to and/or instead of graphene, the panel according to the invention may comprise graphite. It may also be preferred that the decorative panel is free of any graphite.

The most commonly known of graphene derivates are graphene oxide and reduced graphene oxide. Graphene oxide (GO) is a single-atomic layered material, made by the powerful oxidation of graphene, which is relatively cheap and abundantly available. Graphene oxide is an oxidized (and cheaper) form of graphene, laced with oxygen-containing groups. Reduced graphene oxide (RGO) is the form of GO that is processed by chemical, thermal and other methods in order to reduce the oxygen content, while graphene oxide is a material produced by oxidation of graphene which leads to increased interlayer spacing and functionalization of the basal planes of graphene.

As an improved hardness is typically desired across the full upper side of the decorative panel, the graphene and/or graphene derivate(s) preferably covers the substantially entire upper side of the core. This coverage may e.g. be realized by applying a continuous layer, discontinuous layer, overlapping or non-overlapping flakes, of particles composed of graphene and/or at least one graphene derivate.

By using graphene and/or graphene derivate(s), in particular when applied as part of a porous microstructure, in a panel according to the invention, the sound absorption properties, and hence acoustic dampening properties, can be enhanced significantly.

Preferably, the decorative top structure comprises at least two layers of which at least one layer, preferably a substantially transparent or translucent top layer of said top structure, comprises graphene and/or at least one derivative from graphene. The top layer may entirely be composed of graphene and/or at least one derivative from graphene, although it is also imaginable that the top layer comprises a top coating, such as a (hardened or hardenable) lacquer layer or resin layer, wherein the graphene and/or at least one derivative from graphene is/are dispersed and/or at least partially embedded. It is imaginable that the top surface of the decorative top structure is at least partially made from graphene and/or at least one derivative from graphene. It is imaginable that the decorative top structure comprises at least one layer composed of graphene and/or at least one derivative of graphene. Said graphene (derivative) layer can, for example, be a continuous layer or a discontinuous layer or lattice enclosing or provided with one or more fractures. Said at least one layer composed of graphene and/or at least one derivative of graphene may at least partially be enclosed by and/or situated in between two layers of the panel, preferably between two layers of the decorative top structure, such as, for example, the core and a top coating, and/or, a decorative layer and a top coating, and/or the core and a decorative layer, and/or a primer layer and a decorative layer. It is imaginable that the panel, in particular the top structure and/or the core, comprises a plurality of layers, wherein each layer is at least partially composed of graphene and/or at least one graphene derivative.

As addressed above, it is imaginable that at least one layer composed of graphene and/or at least one derivative of graphene is at least partially embedded in at least one other layer of the decorative top structure. This latter layer may also be referred to as matrix layer, which is typically composed of a polymer, such as a PVC or PU, comprising substance. This matrix layer typically substantially entirely encloses the layer composed of graphene and/or at least one derivative of graphene, and may penetrate the layer composed of graphene and/or at least one derivative of graphene, in particular—if applied—fractures (fracture openings) are present in the layer composed of graphene and/or at least one derivative of graphene. Preferably, the thickness of said graphene (derivate(s)) embedded layer is between 0.1 nm and 60 µm, more preferably between 0.1 nm and 50 µm, such as between 0.1 and 1 µm, more preferably such as between 0.2 nm and 0.4 nm. Such a layer can be prefabricated and adhered, typically by gluing and/or fusing, to another panel layer during production of the panel. In case such a layer is produced in-line during the panel production process, it is imaginable that the layer thickness exceeds 50 µm.

It is conceivable that the decorative top structure comprises particles, preferably platelets, such as nanoplatelets, and/or flakes and/or nanoribbons and/or fibres, composed of graphene and/or at least one derivative from graphene. These particles can be randomly distributed in the top structure, although it is commonly preferred to embed said particles in at least one layer of the decorative top structure, preferably at least one polymer layer of the decorative top structure. Preferably, at least a fraction of said particles overlap at least partially, at least as seen from a top view of the panel. It may be preferred to apply elongated and/or circular particles, wherein at least a fraction of said elongated particles overlap at least partially, wherein, more preferably, said overlapping particles have a likewise orientation. In case said particles are incorporated and/or embedded within an extruded polymer based layer, elongated or circular particles may be orientated in substantially the same direction during extrusion of said polymer based layer. This particle orientation will typically be substantially parallel to the extrusion direction, or at least closer to parallel to the extrusion direction than to perpendicular to the extrusion direction, during production of said layer. In this manner a shingle-like structure of graphene (derivate) based particles can be realized, which is in favour of the hardness and impact resistance of the top structure.

The decorative top structure preferably comprises at least one decorative visual print, more preferably a digital decorative print. This print may be applied directly onto the core and/or may be applied on top of a primer layer of the top structure, wherein said primer layer is applied, either directly or indirectly onto the core. The visual print, also referred to as décor image, may be formed by a wood pattern. However, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts.

In a preferred embodiment, the top structure comprises a textured surface, in particular a textured upper surface (defining a top surface of the panel). Preferably, the texture surface makes part of at least one transparent and/or translucent layer, in particular at least one wear layer and/or at least one top coating. Preferably a decorative visual print layer is located underneath said at least one transparent and/or translucent layer. This textured surface (relief surface) typically improves the optical and haptic appearance of the decorative layer. Said textured surface comprises a pattern of recesses (indentations or impressions) and/or projections, wherein said pattern is preferably at least partially realized by means of printing, in particular digital printing (i.e. by means of a digital printing technique). Digital printing is a method of printing from a digital-based image directly to a media. This digital image can be a decorative image, such as the aforementioned decorative visual print, but also an image representing another part of the top structure, such as at least one wear layer and/or at least one top coating. The digital image can either be a 2D or a 3D image. By digitally (3D) printing the top structure, an infinite degree of freedom of design of the top structure (and the decorative layer) can be obtained, wherein the top structure (and the decorative layer) moreover can be applied in an accurate manner with a high level of detail, which leads to realistic appearances and unique, one-of-a-kind decorative panels. This result cannot be achieved by means of traditional mechanically impressed covering structures. As printing device(s), for example, one or more inkjet printers and/or laser printers may be used. As indicated above, a substantially transparent or translucent part of the top structure may be partially or entirely digitally printed. The decorative visual print layer is preferably digitally printed. To this end, transparent or translucent, either coloured or non-coloured (transparent), ink may be used. At least one substance, in particular ink, used to realize at least a part of the decorative top structure, may be provided with graphene and/or graphene derivative(s) and/or other (solid) particles. This latter results in the situation that graphene and/or graphene derivative(s) can be applied by means of printing, in particular digital printing, or alternatively by means of spraying, pouring or rolling.

This allows the printed decorative image to remain visible. The printed décor image(s) of the decorative layer(s) may be based on the CMYK colour principle where the white colour is typically provided by the surface of the white base coat (if applied). This is a 4-color setup comprising cyan, magenta, yellow and black. Mixing these together will give a colour space/gamut, which is relatively small. To increase specific colour or the total gamut spot colours may be added. A spot colour may be any colour. One or more additional colours may be applied, such as at least one additional colour selected from the group consisting of: orange, green, blue, red, white, light grey, light magenta, and light cyan. These colours may be used separately or in combinations. The colours are typically mixed and controlled by a combination of software and hardware (print engine/print heads).

Preferably, at least a part of the textured surface of the top structure is aligned in register with at least a part of at least one decor image formed by the decorative print layer, in particular at least one pattern defined by at least one décor image formed by the decorative print layer. By applying an alignment in register, also referred to as embossing in register, a very realistic and/or artistic design and appearance of the panel can be realized. In this manner, for example, a realistic wood nerve pattern can be realized, wherein the decorated printed wood nerves (2D) are in register (in line) with the embossed printed wood nerves (3D). The same effect can, for example, be realized with a stone like design, an animal skin design, etcetera. Also, in case one or more artificial, decorative grout lines are printed, the textured surface may comprise one or more recessed channels directly above said decorative grout lines to realize a realistic appearance of the panel which is practically equal to the surface relief obtained when using real tiles and grouts.

Preferably, the decorative top structure comprises a decorative visual print layer, at least one substantially transparent or translucent wear layer applied on top of said print layer, and, preferably, at least one substantially transparent or translucent top coating layer applied on top of said at least one wear layer, wherein at least one wear layer and/or at least one top coating layer comprises graphene and/or at least one derivative of graphene. The visual print layer may be composed solely of a decorative ink layer, but is also imaginable that the visual print layer comprises a substrate layer, such as a polymer film or paper film, onto which a decorative ink layer is printed or otherwise applied. Said visual print layer may be attached directly to the core, e.g. by fusing the visual print layer onto the core or by gluing the visual print layer to the core, wherein use can be made e.g. of a polyurethane adhesive. Optionally, an upper surface of the core is covered by at least one primer layer before attaching the visual print layer to the core, wherein the visual print layer will actually be attached to the (upper) primer layer applied to the core. This preferred embodiment implies that (at least a part of) the graphene (derivative(s)) is applied on top of said decorative print layer, and hence is able to contribute to the protection of said decorative print layer. As mentioned above, the decorative top structure can be partially or entirely by realized by digital printing. Optionally, the substance, in particular the ink, to realize at least a part of the wear layer and/or top coating can be enriched (mixed) with particles of graphene and/or graphene derivate(s). It is imaginable that the decorative top structure comprises a decorative visual print layer and a single—only one—transparent or translucent wear layer on top of said visual print layer without applying a separate top coating layer. At one wear layer, and preferably each wear layer in case a plurality of wear would be applied, is preferably made of transparent or translucent polyurethane or, alternatively, polyvinylchloride, polypropylene, or any another suitable transparent or translucent polymer.

Preferably, the decorative top structure comprises at least one composite layer, which composite layer comprises a graphene and/or graphene derivative content between 0.01% and 1.5% by weight, preferably between 0.5% and 1.0% by weight of the composite layer. This amount of graphene and/or graphene derivate is often sufficient to significantly increase the hardness and the impact resistance of the panel, while keeping the cost price increase as limited as possible and/or while keeping the top structure sufficiently transparent and/or translucent to secure sufficient visibility of the decorative print layer of the top structure.

The decorative top structure may comprise at least one layer composed of graphene paper. Graphene paper is typically composed of graphene and/or one or more of its derivatives, such as graphene oxide(s). Graphene paper is preferably at least partially composed of a graphene nanosheets assembled in a layer-by-layer manner. Because of the finite size of the graphene sheets, the in-plane tensile load can hardly be continuously transferred through intralayer bonds of the distributed graphene sheets, thus the interlayer crosslink is preferred to assist the tensile load transfer between adjacent layers. For graphene nanocomposites the intralayer covalent bonds are usually much stronger than interlayer crosslinks. Typically, for graphene paper, the used starting material is water-dispersed graphene oxide flakes, which is vacuum filtrated to produce free standing foils. The thickness of these foils is typically in the range of 0.1-150 $\mu$m, preferably 5-120 $\mu$m. Like graphene, graphene paper is an electrical conductor, and like graphene oxide, graphene oxide paper is an electrical insulator. By graphene-graphene oxide paper, the paper is partially composed of graphene, and partially composed of graphene oxide, optionally reduced graphene oxide. By adjusting the ratio between graphene and graphene oxide, the electrical conductivity of the paper can be tuned. This may be used to optimize the conductive properties for the aimed application of the decorative panel according to the invention. It is imaginable that the decorative top structure comprises at least one decorative print layer which is positioned above said graphene (oxide) comprising paper, and wherein said graphene (oxide) comprising paper preferably bears said decorative print layer.

Preferably, the Young's modulus of the decorative top structure is between 9-181 GPa, preferably between 9 and 50 GPa, more in particular approximately 10 GPa. The actual Young's modulus strongly depends on the amount of graphene and/or graphene oxide used, as well as on in which form said graphene and/or graphene is applied. Typically, graphene sheets as such may have a Young's modulus of 1,000 GPa. When graphene is used a part of a composite material in a layer of the top structure, which is often the case, the Young's modulus will typically drop below 181 GPa, and will mostly be around 10 GPa.

Preferably, at least one substantially transparent or translucent layer of the decorative top structure is a printed layer.

This layer may or may not comprise graphene and/or graphene derivative(s). It is imaginable that the entire top structure is applied by means of digital printing. It is also imaginable that a part of the top structure, including at least one decorative layer, and at least one wear layer, is applied by means of digital printing.

At least a part of the core may be a thermally insulating (dielectric) and/or at least a part of the core may be thermally conductive. At least a part of the core may be foamed. At least a part of the core may be solid (non-foamed). The core may be flexible, semi-rigid or substantially rigid. The core may comprise at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), polyisocyanurate (PIR), or mixtures thereof. The core may comprise wood and/or at least one wood-based material. The core may comprise at least one composite material of at least one polymeric material and at least one non-polymeric material. The at least one non-polymeric material is preferably selected from the group consisting of: talc, chalk, wood, calcium carbonate, and a mineral filler. The core may comprise magnesium oxide and/or magnesium hydroxide. The upper side of the core is preferably substantially flat. The core may comprise graphene and/or at least one derivative of graphene, more in particular wherein the core comprises at least one layer which is at least partially composed of graphene and/or at least one derivative of graphene. The core and/or the decorative top structure may comprises at least one reinforcement layer. At least one reinforcement layer may be formed by a graphene and/or graphene oxide based layer. It may be preferred that a centreline divides the core into an upper section and a lower section, wherein at least one layer at least partially composed of graphene and/or at least one derivative of graphene is (eccentrically) situated in the upper section and/or lower section of the core. Optionally, graphene and/or at least one derivative of graphene is merely present in the core, while the top structure is free of any graphene and/or at least one derivative of graphene. Reinforcing the decorative panel by at least one reinforcement layer, which is, as said, preferably at least partially composed of graphene and/or graphene derivate(s), allows the core, and hence the panel, to be composed in a relatively light-weight manner, wherein, for example, the core thickness, and hence the panel thickness, can be reduced and/or the core density, and hence the overall panel density, can be reduced. This typically leads to material savings and cost savings, and moreover a more practical panel from a handling, transportation and installation point of view.

Preferably, the panel comprises a plurality of interconnected sheets and/or interconnected flakes and/or interconnected lamella. This typically results in an open cell network, in particular a porous microstructure and/or nanostructure, which may lead to an improvement of sound dampening properties of around 60%, in particular in the audible frequency range from 128 to 4,000 Hertz.

However, although the above networked structure leads to serious benefits, these microstructures may be hard to be designed in a controllable manner. This could further be improved by means of a graphene-polymer based foam, preferably a graphene-polyurethane based foam, more preferably a self-aligned and hierarchically porous graphene-polyurethane foam. Preferably, said foam comprises wavy-type ordered and/or web-type disordered and/or curved lattices at least partially composed of graphene and/or at least one derivative of graphene, wherein said lattices are arranged in a polymer, in particular polyurethane, open or semi-open cell frame. The lattices are preferably composed of a plurality of interconnected sheets and/or interconnected flakes and/or interconnected lamella. The wavy-type ordered lattices based foam ("wavy foam") could be assembled through the shaping of physical cross-links between graphene sheets from the reduction of graphene oxide by sol-gel chemistry. The web-type disordered based foam ("web foam") could be assembled from the gasification and separation of graphene sheets during potassium hydroxide activation (consisting of redox reactions including the oxidation of carbon to carbon oxide and carbonate, while KOH was reduced to be metallic potassium).

The cell size distribution of the wavy foam may range from 10 to 300 micron, indicating a heterogeneous structure with a porosity of approximately 53%. The average cell size of the wavy foam may be approximately 64 mm. The web foam may have an 90-100 micron average cell size and an average porosity of 50-52%. The way foam typically improves the sound absorption performance of the traditional polymer foams, in particular PU foams, at all frequency bands. The Wavy foam with a narrow gap between graphene layers shows better sound absorption performance than the Web foam with a wide gap between graphene layers. Also the web foam has better sound dampening properties compared to traditional polymer foams. The increase of sound absorption coefficient of a wavy foam and a web foam is at least 0.2 higher than the sound absorption coefficient of a bare polymer foam, in particular a bare PU foam. Preferably, the graphene-polymer based foam, preferably a graphene-polyurethane based foam, and/or the panel as such has sound absorption coefficient of at least 0.7, preferably at least 0.75. The microporous structure of the foam induces a high flow resistivity and high tortuosity, which slows down the sound speed within the foam, and which in favour of the sound dampening properties. Preferably, the graphene-polymer based foam, preferably a graphene-polyurethane based foam, has a tortuosity of 2-3.5. Tortuosity is a property of a curved channel being tortuous, in the sense of twisted and having (many) turns. Hence, the tortuosity describes the influence of the internal structure on the acoustical behaviour of the material. The tortuosity is a measure for the elongation of the pressing way through the pores, compared to the thickness of the foam. The common measuring technique of the tortuosity is based on ultrasonic sound velocities.

It is believed that the reason why the wavy and web foams absorb more effectively in low frequency range than traditional bare PU foam can be explained by morphological and compositional factors. Wavy and web foams exhibit a higher elasticity than a traditional bare PU foam, which is because the elastic porous materials absorb the sound by energy loss due to heat exchange, being anisothermal process in the low frequency range. Moreover, the large surface and small cell size of graphene multi-layers, where energy can be dissipated by interfacial sliding and stick-slip behaviour, increases the tortuous path and affected sound absorbing performance in the low frequency range. The wavy foam exhibits better performance in low-frequency noise absorption due to its complex geometry, which is derived from interconnecting graphene sheets connected to adjacent cells across gaps and pores. The graphene layers which are arranged at intervals of less than 100 mm are typically interconnected inside the (foamed) polymer skeleton. This reduces the size of the large pores and changes the path of the sound waves to the inner void space. As a result, this greatly increases the twisting of the sound waves and enhances energy dissipation. In addition, the incident sound energy causes micro-vibrations of microscale graphene layers, resulting in further energy attenuation. This attenuated energy is converted to thermal energy and is quickly released to the outside of graphene, which has excellent thermal conductivity. The graphene-polymer based foam, preferably a graphene-polyurethane based foam, has an openness of 10-30%, preferably of 15-25%, more preferably of 15-22%. Preferably, the graphene-polymer based foam, preferably a graphene-polyurethane based foam, has a porosity of 30-60%, more preferably 50-55%.

Preferably, the graphene-polymer based foam, preferably a graphene-polyurethane based foam, makes part of the core and/or the decorative top structure and/or a backing layer affixed, directly or indirectly, to a lower side of the core.

The panel preferably comprises a backing layer affixed, directly or indirectly, to a lower side of the core. As mentioned above, this backing layer may be at least partially composed of graphene-polymer based foam, preferably a graphene-polyurethane based foam. However, it is also imaginable that the backing layer is at least partially composed of alternative materials, like cork, rubber, cellulose, and/or polymer.

Preferably, the panel is provided with a thermal reflective layer between the core and the decorative top structure. This feature provides the panel leads to less heat absorption (and dissipation) by the panel, which facilitates the surrounding (indoor) atmosphere to be kept at a desired temperature.

It is imaginable that the decorative top structure comprises at least one conductive layer at least partially composed of graphene and/or at least derivative of graphene, wherein said conductive layer defines a part of opposing side edges of the panel. This means that the edge(s) of the conductive layer is/are exposed (when considering a panel in non-locked condition). In interlocked condition of adjacent panels, the conductive layers of adjacent panels are preferably interconnected allowing transfer of electrical and/or thermal energy between said panels. These interconnected conductive layers of different panels facilitate transmission of thermal and/or electrical energy between panels. This property can be used in various manners. For example, the facilitated transmission of thermal energy can be used to dissipate thermal energy present in a (warm) panel towards one or more other (cooler) panels. This phenomenon can also e.g. be used to use the panels as heating source, in particular flooring heating or wall heating, to heat a room. The facilitated transmission of electrical charge (electrical energy) can be used, for example, to realize an antistatic decorative covering consisting of a plurality of interlocked decorative panels according to the invention. In this manner (excessive) static electricity, present/generated in a panel, can easily be dissipated to other panels. Optionally, each panel has a ground connection connecting the conductive layer to a lower side of the panel to facilitate grounding (earthing) of the panel. This electrical connection between the conductive layer may also be used as electrical heating layer to allow the panels to act as heating panels, such as floor heating panels or wall heating panels.

It has been found that graphene and graphene derivates, like graphene oxide, and reduced graphene oxide, in the following section referred to as graphene materials ("GMs") also exhibit excellent antibacterial and antiviral properties due to their nanomaterial-triggered biosensing action and direct interaction with various cell types and statuses such as bacteria, fungi, and tumoral/normal mammalian cells. Interestingly, the interaction between bacteria and GMs reveals bacteria's ability to reduce graphene due to the bacteria's interaction with graphene oxide, which reduces the bacteria's oxygen-containing functional groups by glycolysis interaction. In this way, bacteria seem to be passively killing themselves while reducing graphene oxide.

The antimicrobial effect of the GMs in the panel according to the invention may be improved by enriching the GM(s) used with at least one of the following additives, in particular metals and/or metal oxides.

Silver nanoparticles (AgNPs) are well known for their broad-spectrum antimicrobial activity, and many studies have demonstrated their antibacterial efficacy against a variety of bacterial strains including *E. coli, S. aureus*, methicillin-resistant *S. aureus* (MRSA), and methicillin-resistant *Staphylococcus epidermidis*. By conjugating AgNPs to graphene oxide sheets, e.g. by using diallyl-dimethyl-ammonium chloride (PDDA), a significantly increased antibacterial activity in comparison to AgNPs alone can be obtained. Polyethyleneimine (PEI) is another linker material that can be used in this respect, and which leads to a GO-PEI-AgNPs hybrid complex with antibacterial activity based on the blade-like edge which is characterized by long-term antibacterial activity and excellent stability and, consequently, causes bacterial cell destruction. Also, conjugated AgNPs to sodium 1-naphthalenesulfonate (NA) functionalized reduced graphene oxide (NArGO) may be used; the resulting AgNP-NArGO nanostructure hybrid demonstrate extensive antibacterial capability, tremendous stability, and minor cytotoxicity. These conjugation approaches show significant enhancement in the antimicrobial activity by merging two potent antimicrobial materials.

Furthermore, zinc oxide (ZnO) may be used to be conjugated to graphene oxide (nanoparticles), which also manifest high bactericidal activity against *E. coli* as well as low cytotoxic effects toward HeLa cells in different concentrations. Alternatively, poly-l-lysine (PLL) reduced graphene oxide, enriched with copper (nano)particles also demonstrates a long-term additively antibacterial impact against Gram-negative *E. coli* and Gram-positive *S. aureus* in which practically all bacteria were killed. Also, a nanocomposite system consisting of reduced graphene oxide and iron oxide nanoparticles (rGO-IONPs) demonstrates a noticeable reduction in bacterial cell viability both in vitro and in vivo. Furthermore, it was found that a graphene oxide surface doped with iron oxide and silver nanoparticles displays a high antibacterial activity against *E. coli* and *S. aureus*. Generally, the involved antibacterial mechanism is based on physical pressure, oxidative stress, and reactive oxygen species (ROS) (by-products of normal cell activity) production exerted by the applied nanoparticles.

The antimicrobial effect of GM(s), optionally enriched with one or more metals and/or metal oxide, is more present in case the GM(s) is/are located at the top surface of the panel or close to the top surface of the panel. In particular in case the top surface of the panel is textured, rather than smooth, these antimicrobial properties are favourable as microbes are inclined to grow and develop within recesses of the textured surface, since these recesses are commonly untouched during normal use (e.g. when walking across said panel), and since these recesses may contain water (in case the panel is applied as floor panel).

In a preferred embodiment, the first coupling profile and the second coupling profile are preferably configured such that two of such panels can be coupled to each other by means of a lowering movement (fold-down movement).

Preferably, the first coupling profile comprises:
    an upward tongue,
        at least one upward flank lying at a distance from the
        upward tongue,
        an upward groove formed in between the upward tongue
        and the upward flank wherein the upward groove is
        adapted to receive at least a part of a downward tongue
        of a second coupling profile of an adjacent panel, and
        optionally, at least one first locking element, preferably
        provided at a distant side of the upward tongue facing
        away from the upward flank,
and wherein the second coupling profile preferably com-
prises:
    a first downward tongue,
        at least one first downward flank lying at a distance from
        the downward tongue,
        a first downward groove formed in between the down-
        ward tongue and the downward flank, wherein the
        downward groove is adapted to receive at least a part of
        an upward tongue of a first coupling profile of an
        adjacent panel, and
        optionally, at least one second locking element adapted
        for co-action with a first locking element of an adjacent
        panel, said second locking element preferably being
        provided at the downward flank.
    Preferably, the first locking element comprises a bulge
and/or a recess, and wherein the second locking element
comprises a bulge and/or a recess. The bulge is commonly
adapted to be at least partially received in the recess of an
adjacent coupled panel for the purpose of realizing a locked
coupling, preferably a vertically locked coupling. It is also
conceivable that the first locking element and the second
locking are not formed by a bulge-recess combination, but
by another combination of co-acting profiled surfaces and/or
high-friction contact surfaces.
    It is imaginable that the first coupling profile and the
second coupling profile are configured such that in coupled
condition a pretension is existing, which forces coupled
panels at the respective edges towards each other, wherein
this preferably is performed by applying overlapping con-
tours of the first coupling profile and the second coupling
profile, in particular overlapping contours of downward
tongue and the upward groove and/or overlapping contours
of the upward tongue and the downward groove, and
wherein the first coupling profile and the second coupling
profile are configured such that the two of such panels can
be coupled to each other by means of a fold-down movement
and/or a vertical movement, such that, in coupled condition,
wherein, in coupled condition, at least a part of the down-
ward tongue of the second coupling profile is inserted in the
upward groove of the first coupling profile, such that the
downward tongue is clamped by the first coupling profile
and/or the upward tongue is clamped by the second coupling
profile.
    A side of the upward tongue facing towards the core may
be at least partly inclined towards the core or the upward
flank and a side of the downward tongue facing towards the
core may be at least partly inclined towards the core or the
downward flank, wherein the locking portions may be
formed by said inclined parts, wherein, in particular, said
sides of the tongues and the plane of the panel enclose an
angle between 90 and 10 degrees. The inclination of the
sides of the tongues towards the respective grooves results
in the formation of so-called closed grooves. A closed
groove means that the minimal width of the groove is
smaller than the maximal width of the tongue, and that
deformation of at least one of the coupling parts needs to occur in order to push the tongue into the groove. Alterna-
tively, a side of the upward tongue facing towards the core
may be at least partly inclined away from the core or the
upward flank and a side of the downward tongue facing
towards the core may be at least partly inclined away from
the core or the downward flank, wherein, in particular, said
sides of the tongues and the plane of the panel enclose an
angle between 90 and 110 degrees. The inclination of the
sides of the tongues towards the respective grooves results
in the formation of so-called open grooves.
    In case the panel is rectangular, then the first panel edge
and second panel edge are typically situated at opposite
short edges of the panel. The panel preferably also com-
prises at least one third coupling profile and at least one
fourth coupling profile located respectively at a third panel
edge and a fourth panel edge, wherein the third coupling
profile comprises:
    a sideward tongue extending in a direction substantially
        parallel to the upper side of the core, at least one second
        downward flank lying at a distance from the sideward
        tongue, and
    a second downward groove formed between the sideward
        tongue and the second downward flank,
    wherein the fourth coupling profile comprises: a third
        groove configured for accommodating at least a part of
        the sideward tongue of the third coupling profile of an
        adjacent panel, said third groove being defined by an
        upper lip and a lower lip, wherein said lower lip is
        provided with an upward locking element,
    wherein the third coupling profile and the fourth coupling
        profile are configured such that two of such panels can
        be coupled to each other by means of a turning move-
        ment (angling down movement), wherein, in coupled
        condition: at least a part of the sideward tongue of a
        first panel is inserted into the third groove of an
        adjacent, second panel, and wherein at least a part of
        the upward locking element of said second panel is
        inserted into the second downward groove of said first
        panel.
    Alternative, more intricate coupling profiles are also
envisaged, such as coupling profiles which interlink by an
angling movement of two side edges of neighbouring pan-
els, or even by a vertical 'drop-down' movement of one side
edge of panel towards the other side edge of a neighbouring
panel. These type of coupling profiles have the additional
advantage that the side edges once connected, achieve an
interlocking of the profiles in horizontal direction. Prefer-
ably, at least a part of at least one coupling profile, preferably
each coupling profile, is integrally made from material of the
support panel.
    The panel according to the invention is typically rectan-
gular, square, of hexagonal, although other shapes are also
imaginable. The panel according to the invention can be
used indoor, but may also be used outdoor.
    As mentioned above, by incorporating graphene and/or at
least one derivate of graphene in the decorative top structure,
the hardness, and hence the indentation and impact resis-
tance of the top structure, and hence of the decorative panel
as such, can be increased significantly. Preferably, the
residual indentation of the panel according to the invention
is lower than 0.15 mm, more preferably lower than 0.10 mm,
most preferably lower than 0.05 mm, when tested in accor-
dance with EN ISO 24343-1. Preferably, the impact resis-
tance of the panel according to the invention is larger than
1800 mm, preferably larger than 2000 mm, when tested in
accordance with EN 16511. When tested the micro-scratch
resistance in accordance with EN 16094, the panel according to the invention, the gloss change of a micro-scratched panel compared to an unscratched panel is preferably less than 30%, more preferably less than 10% (MSR-A1). When tested the micro-scratch resistance in accordance with EN 16094, the panel according to the invention, preferably no visible scratches are present on the panel (MSR-B1).

The invention also relates to a decorative covering, in particular a floor covering, ceiling covering, or wall covering, consisting of a plurality of interlocked panels according to the invention.

The invention also relates to a method for manufacturing of a decorative panel according to the invention, comprising the steps:

a) providing a core;

b) creating and affixing, either directly or indirectly, a decorative top structure on said upper side of the core, wherein the decorative top structure comprises graphene and/or at least one derivative of graphene; and c) providing the first panel edge with the first coupling profile, and the second panel edge with the second coupling profile being designed to engage interlockingly with said first coupling profile of an adjacent panel, both in horizontal and in vertical direction.

Preferably, the top structure comprises a plurality of layers, including at least one graphene and/or graphene derivative based layer, wherein during step b) at least one graphene and/or graphene derivative based layer is applied by means of chemical vapor deposition and/or by using a graphene suspension and/or derivative of graphene suspension. It is also imaginable that during step b) at least one graphene and/or graphene derivative based layer is applied by transferring at least one graphene and/or graphene derivative based layer from a transfer foil onto another panel layer, and/or is (digitally) printed onto another panel layer. The transfer foil may or may not be removed after application graphene and/or graphene derivative based layer onto said other panel layer. Hence, the transfer foil can be either a temporary carrier of the graphene and/or graphene derivative based layer or can become integral part of the top structure of the panel. The top structure may comprise a plurality of layers, including at least one graphene and/or graphene derivative based layer, wherein during step b) at least one graphene and/or graphene derivative based layer is electrochemically deposited onto another panel layer, in particular onto a textured upper surface of another panel layer.

BRIEF DESCRIPTION OF THE INVENTION

The terms Fig., Figs., Figure, and Figures are used interchangeably in the specification to refer to the corresponding figures in the drawings.

Figures 2, 3:
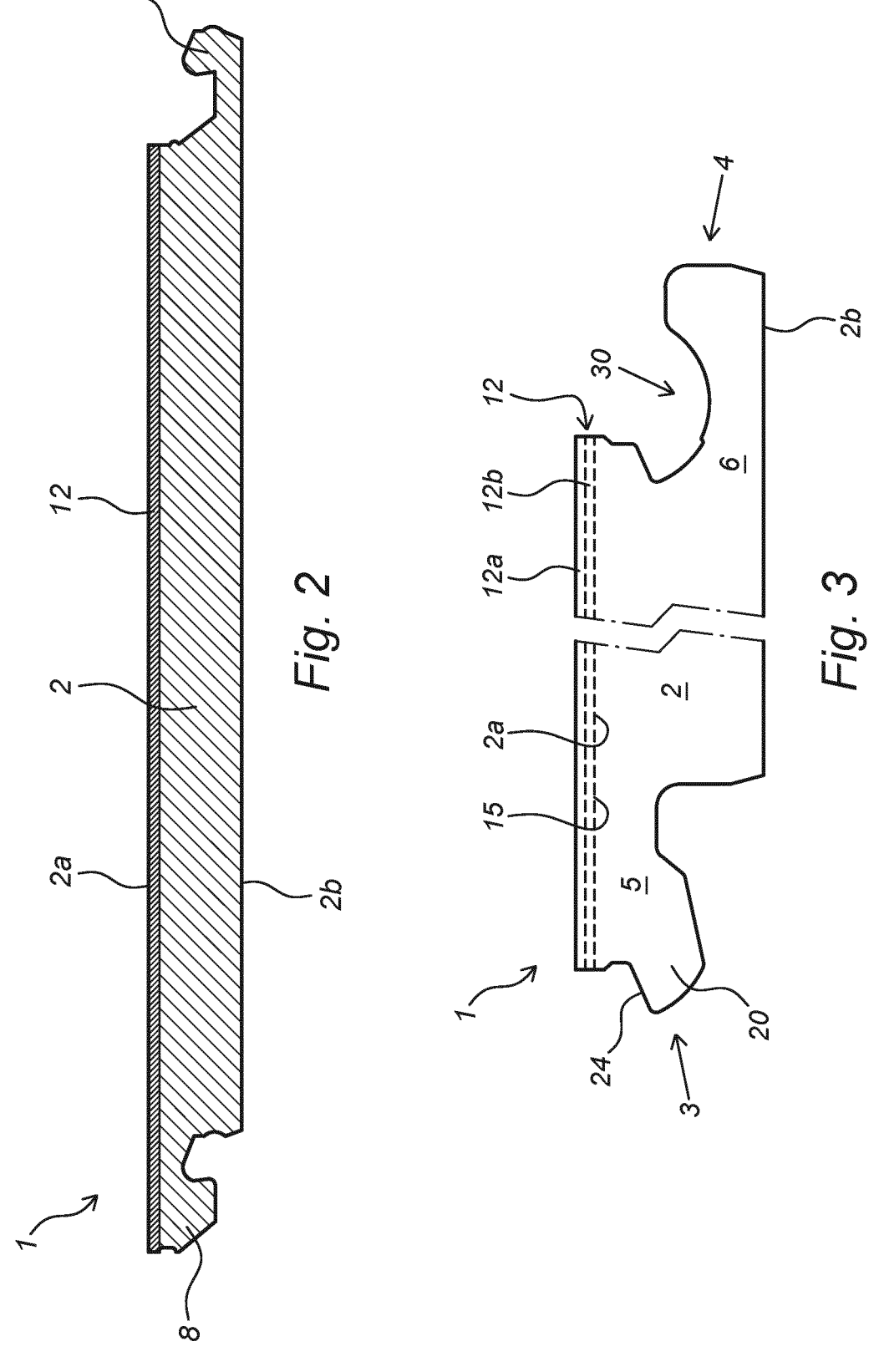
Figure 4:
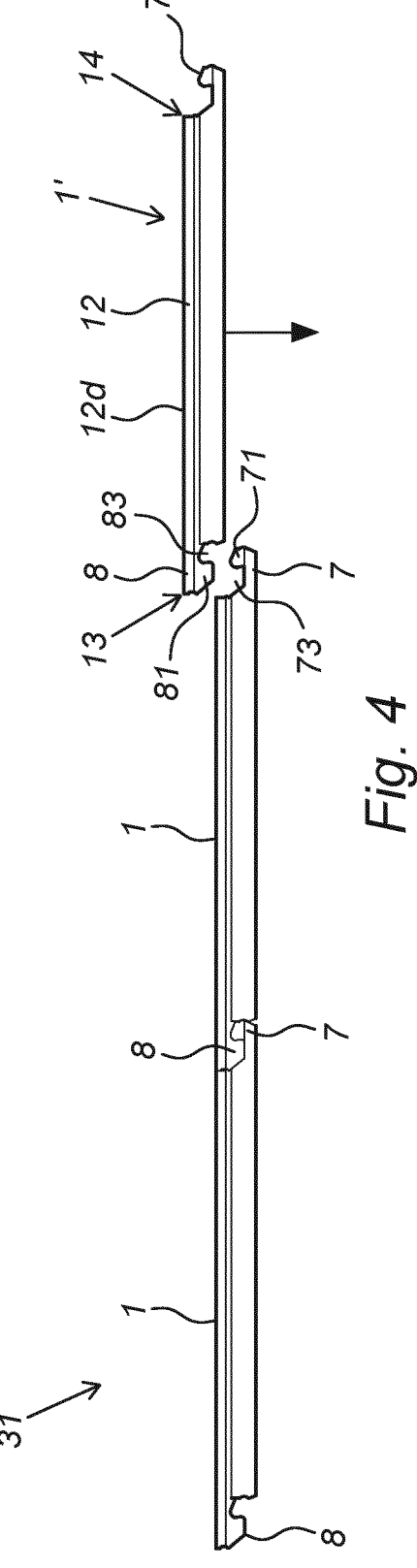

The invention will be further elucidated according to the following non-limitative figures:

FIG. 1 shows a perspective view of an embodiment of a decorative panel according to the invention; and FIG. 2 shows a schematic transversal cross-section along line B-B of an embodiment of a decorative panel according to the invention, wherein the decorative top structure comprises a substantially homogeneous mixed material; and FIG. 3 shows a schematic transversal cross-section along line A-A of an embodiment of a decorative panel according to the invention, showing another embodiment of a decorative top structure wherein the decorative top structure is a laminated structure; and FIG. 4 shows a transversal cross-section of an embodiment of a decorative panel covering according to the invention.

DESCRIPTION OF THE INVENTION

FIG. 1 shows a perspective view of an embodiment of a decorative panel 1 according to the present invention. The panel is of a rectangular shape having a length extending longitudinally along line B-B, and a width extending transversally along line A-A. The panel 1 is provided with a core 2 provided with an upper side and a lower side. The panel is provided with a decorative top structure 12 affixed, either directly or indirectly, on said upper side of the core 2. The sides of the decorative panel 1 are provided with coupling profiles 5,6,7,8. At opposite edges 9,10 a first panel edge 3 comprising a first coupling profile 5, and a second panel edge 4 comprising a second coupling profile 6. The coupling profiles are designed such that the second coupling profile 6 engage interlockingly with said first coupling profile 5 of an adjacent panel, both in horizontal and in vertical direction. The panel 1 is further provided with a third coupling profile 7 and fourth coupling profile 8 at opposite edges 9 and 10 respectively, which also interlockingly engage. Said decorative top structure 12 comprises graphene and/or at least one derivative of graphene. Graphene is typically defined as a single carbon layer, which monolayer is composed of sp2-hybridized carbon atoms bonded to each other, typically with a 0.142 nm length bond, and tightly packed into a honeycomb lattice, forming a two-dimensional crystal. The monolayer (2D layer) may extend over and cover the entire upper side of the core and/or may be formed by flakes or platelets or other particle-like structures. A graphene and/or graphene derivative(s) monolayer may, alternatively or additionally, be embedded within the core. In the top structure, graphene and/or graphene derivative(s) may be presents are loose particles and/or interconnected particles, which may even be applied by means of digital printing or spraying, typically as constituent of an ink used. A suitable graphene derivative is graphene oxide (GO), which is the oxidized derivative of a graphene molecule, obtained by acid oxidation of graphene or graphite, resulting in a molecular structure containing oxygen functional groups (such as e.g. hydroxyl, carboxyl, carbonyl, and epoxy). Another suitable graphene derivate is reduced graphene oxide (rGO), which is a graphene derivative obtained through chemical or thermal reduction of GO, i.e., the reduction of the oxygen functional groups in GO. rGO is characterized by its moderately reduced number of functional groups, a high number of electroactive sites, and its structural similarity to graphene. Preferably, the top surface of the decorative top structure 12 is at least partially made from graphene and/or at least one derivative from graphene. Examples thereof are shown and described in FIGS. 2 and 3.

FIG. 2 shows a transversal cross-section of an embodiment of a decorative panel 1 according to the present invention, provided with a core 2, a decorative top structure 12 and coupling profiles 7,8. The decorative top structure 12 is directly or indirectly affixed to the upper side 2a of the core 2. For example, the top structure 12 may be glued, by means of an adhesive, and/or fused onto the core 2. The upper side 2a of the core 2 may be substantially flat or may have a textured surface for example when the core comprises a foam material, such as e.g. a graphene-polymer based foam, preferably a graphene-polyurethane based foam, more preferably a self-aligned and hierarchically porous graphene-polyurethane foam. The lower side of the core 2*b* may be the lower side of the panel, or may be affixed to a (not shown) base layer. In this embodiment, the top structure 12 is schematically shown as a substantially homogeneous mixed material, for example comprising graphene in the form of particles such as nanoplatelets mixed with a polymer. The decorative top structure 12 may comprise a laminated structure as shown in FIG. 3.

FIG. 3 shows in transversal cross-section the first coupling part 5 at side edge 3 and the second coupling part 6 at opposing side edge 4. The first coupling part 5 comprises a sideward tongue 20 and the second coupling part 6 comprises a recess 30 for accommodating at least a part of the sideward tongue 20 of a further panel. The recess 30 is configured to actively co-act with a sideward tongue 20 of another panel, in a coupled condition of such panels.

The figure also shows a laminated panel 1 which comprises a core 2, and a graphene and/or derivative of graphene comprising decorative top structure 12 affixed, either directly or indirectly, on the upper side 2*a* of the core 2. The core 2 comprises preferably an insulating material and/or the panel 1 may further be provided with a thermal reflective layer 15 between the upper side 2*a* of the core 2 and the decorative top structure 12.

In the shown embodiment, the laminated decorative top structure 12 comprises multiple layers 12*a*,12*b*, wherein at least one of the layers comprises graphene and/or at least one derivative of graphene. Several non-limitative embodiments of these layers will be further described below.

In a first embodiment, layer 12*a* is a substantially transparent or translucent top layer, which comprises graphene and/or at least one derivative from graphene. In this embodiment wherein 12*a* is a transparent or translucent layer comprising graphene and/or at least one derivative of graphene, layer 12*b* may comprise a decorative layer comprising a decorative visual print, in particular a thermoplastic or paper film carrying a, preferably digitally printed, decorative image. The graphene comprising top layer 12*a* serves as a protective layer, such as a finishing layer, and/or a wear layer, positioned on top of said decorative layer.

In a second embodiment, the layer 12*a* is a transparent or translucent finishing layer and layer 12*b* comprises graphene and/or at least one derivative from graphene for providing the desired mechanical properties to the panel such as scratch-resistance or indentation resistance.

Any of the layers 12*a*, 12*b* may also be one composite layer, which composite layer comprises a graphene and/or graphene derivative content between 0.01% and 1.5% by weight, preferably between 0.5% and 1.0% by weight of the composite layer. It is also possible that the layers 12*a* and 12*b* together form one composite material, such as shown in FIG. 2.

Either of the layers 12*a*, 12*b* may have a composition wherein the layer comprises particles, preferably nanoplatelets and/or flakes and/or nanoribbons, composed of graphene and/or at least one derivative from graphene. Optionally, said particles are embedded in one or both layers of the decorative top structure, preferably at least one polymer layer of the decorative top structure.

In another embodiment a third layer 12*c* (not shown) is applied on top of the top layer 12*a*, such that the decorative top structure 12 comprises a decorative visual print layer 12*b*, at least one substantially transparent or translucent wear layer applied on top of said print layer 12*b*, and at least one substantially transparent or translucent of translucent top coating layer 12*c* (not shown) applied on top of said at least one wear layer 12*a*, wherein at least one wear layer and/or at least one top coating layer comprises graphene and/or at least one derivative of graphene.

FIG. 4 shows a decorative covering 31 consisting of a plurality of interlocked panels according to the invention. The figure shows how the coupling profiles 7 and 8 can be coupled to each other when connecting a panel 1 and a panel 1' to each other. The panel 1' is hereby moved vertically downwards along the arrow, wherein the profiles 7 and 8 engage with each other by receiving upward tongue 71 in downward groove 83 and receiving downward tongue 81 in upward groove 73. Optionally, the decorative top structure 12 of the panels comprise at least one conductive layer 12*d*, which layer is at least partially composed of graphene and/or at least derivative of graphene, wherein said conductive layer 12*d* defines a part of opposing side edges 13, 14 of the panel 1, 1'. In this embodiment, the conductive layers of adjacent panels 1, 1' are interconnected when the panels are in interlocked condition, the allowing transfer of electrical and/or thermal energy between said panels 1, 1'.

The coupling profiles shown in the figures serve as an example, any other coupling profiles for interlocking adjacent panels according to the invention may be incorporated.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The ordinal numbers used in this document, like "first", "second", "third", and "fourth" are used only for identification purposes. Hence, the use e.g. of the expressions "third locking element" and "second locking element" does therefore not necessarily require the co-presence of a "first locking element". The decorative panels according to the invention may also be referred to as decorative tiles. By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the panel. By locking in "horizontal direction" is meant locking in a direction perpendicular to the respective coupled edges of two panels and parallel to or falling together with the plane defined by the panels.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, comprising:
   a core provided with an upper side and a lower side,
   a decorative top structure affixed, either directly or indirectly, on said upper side of the core,
   a first panel edge comprising a first coupling profile, and
   a second panel edge comprising a second coupling profile being designed to engage interlockingly with said first coupling profile of an adjacent panel, both in horizontal and in vertical direction, wherein the panel comprises graphene and/or at least one derivative of graphene, and wherein a top surface of the decorative top structure is at least partially made from the graphene and/or the at least one derivative of graphene.

2. The panel according to claim 1, wherein the panel comprises the at least one derivative of graphene chosen from the group consisting of: graphene oxide and reduced graphene oxide.

3. The panel according to claim 1, wherein the decorative top structure comprises at least two layers of which at least one layer comprises the graphene and/or the at least one derivative of graphene.

4. The panel according to claim 1, wherein the decorative top structure comprises at least one layer composed of the graphene and/or the at least one derivative of graphene.

5. The panel according to claim 1, wherein the panel comprises particles composed of the graphene and/or the at least one derivative from graphene.

6. The panel according to claim 1, wherein the decorative top structure comprises a decorative visual print layer, at least one substantially transparent or translucent wear layer applied on top of said print layer, and at least one substantially transparent of translucent top coating layer applied on top of said at least one wear layer, wherein at least one wear layer and/or at least one top coating layer comprises the graphene and/or the at least one derivative of graphene.

7. The panel according to claim 1, wherein the panel comprises at least one layer composed of the graphene and/or graphene the at least one derivative of graphene, wherein the thickness of said layer is between 0.1 nm and 1 nm.

8. The panel according to claim 1, wherein the panel comprises graphene paper.

9. The panel according to claim 1, wherein the core is at least partially composed of a dielectric material.

10. The panel according to claim 1, wherein the core comprises the graphene and/or the at least one derivative of graphene, wherein a centreline divides the core into an upper section and a lower section, wherein at least one layer at least partially composed of the graphene and/or the at least one derivative of graphene is situated in the upper section and/or lower section of the core.

11. The panel according to claim 1, wherein the decorative top structure comprises at least one conductive layer at least partially composed of the graphene and/or the at least one derivative of graphene, wherein said conductive layer defines a part of opposing side edges of the panel.

12. The panel according to claim 1, wherein at least one metal or metal oxide is conjugated to the graphene and/or the at least one derivative of graphene.

13. The panel according to claim 1, wherein the panel comprises a plurality of interconnected sheets and/or interconnected flakes and/or interconnected lamella, wherein the panel comprises a graphene-polymer based foam, wherein said foam comprises wavy-ordered and/or web-disordered and/or curved lattices at least partially composed of the graphene and/or the at least one derivative of graphene, wherein said lattices are arranged in a polymer, open or semi-open cell frame, wherein the lattices are composed of a plurality of interconnected sheets and/or interconnected flakes and/or interconnected lamella.

14. The decorative covering consisting of a plurality of interlocked panels according to claim 1.

15. The method for manufacturing the decorative panel according to claim 1, comprising the steps:

a) providing the core;

b) creating and affixing, either directly or indirectly, the decorative top structure on said upper side of the core, wherein the panel comprises the graphene and/or the at least one derivative of graphene, wherein the top surface of the decorative top structure is at least partially made from the graphene and/or the at least one derivative of graphene; and c) providing the first panel edge with the first coupling profile, and the second panel edge with the second coupling profile being designed to engage interlockingly with said first coupling profile of the adjacent panel, both in the horizontal and in the vertical direction.

16. The method according to claim 15, wherein the top structure comprises a plurality of layers, including at least one graphene and/or graphene derivative based layer, wherein during step b) the at least one graphene and/or graphene derivative based layer is applied by means of chemical vapor deposition.

17. The method according to claim 15, wherein the top structure comprises a plurality of layers, including at least one graphene and/or graphene derivative based layer, wherein during step b) the at least one graphene and/or graphene derivative based layer is applied by using a graphene suspension and/or derivative of graphene suspension.

18. The method according to claim 15, wherein the top structure comprises a plurality of layers, including at least one graphene and/or graphene derivative based layer, wherein during step b) the at least one graphene and/or graphene derivative based layer is electrochemically deposited onto another panel layer.

19. The method according to claim 15, wherein during or subsequent to step a) or step b), at least one panel layer of graphene-polymer based foam is applied.

* * * * *